United States Patent [19]

Leypold et al.

[11] 4,090,200
[45] May 16, 1978

[54] METHOD FOR THE COMPARATIVE VECTOR MEASUREMENT OF SIGNAL PULSES ARRIVING NEARLY SIMULTANEOUSLY AT SEVERAL RADIO RECEIVING STATIONS

[75] Inventors: Dieter Leypold, Munich; Erwin Vachenauer, Haar; Klaus v. Pieverling, Wolfratshausen, all of Germany

[73] Assignee: Siemens Aktiengesellschaft, Berlin & Munich, Germany

[21] Appl. No.: 629,284

[22] Filed: Nov. 6, 1975

[30] Foreign Application Priority Data

May 27, 1975 Germany ............................ 2523504

[51] Int. Cl.$^2$ .................................................. G01S 1/44
[52] U.S. Cl. ................................... 343/106 R; 325/408
[58] Field of Search ...................... 343/106 R, 7 AG; 325/399, 402, 408, 411

[56] References Cited

U.S. PATENT DOCUMENTS

| 3,305,787 | 2/1967 | Distler et al. ............... 343/106 R |
| 3,361,971 | 1/1968 | Eaves ............................. 343/7 AG |
| 3,526,849 | 9/1970 | Dishal et al. ............... 343/106 R |
| 3,831,095 | 8/1974 | Mounce ........................ 325/408 |

Primary Examiner—Maynard R. Wilbur
Assistant Examiner—T. M. Blum

Attorney, Agent, or Firm—Hill, Gross, Simpson, Van Santen, Steadman, Chiara & Simpson

[57] ABSTRACT

A method for the comparative vector measurement of keyed radio signal pulses arriving nearly simultaneously at several radio receivers, particularly DME pulses, which can exhibit great level differences. The pulses at each receiver are individually fed to an amplifier or attenuator having an amplification or attenuation, respectively, which can be adjusted in distinct steps, whose reduction or increase, respectively, takes place automatically with the rise of the leading edge of the respective signal pulse. After passing through the respective amplifier or attenuator of the receivers, the instantaneous amplitudes of the measuring signals are measured at a specific measured time which is common to all receivers. In each receiver, an individual measuring time is ascertained in such a way that switching pulses derived from the step-wise amplification reduction of the amplifier (or the step-wise attenuation increase of the attenuator) are fed to a retriggerable monostable multivibrator having a specific holding time, during the operating sequence of which the individual measuring time of each receiver is provided. After this measuring time, or after the measuring time, to all receivers, an additional step-wise reduction in amplification or increase in attenuation at the respective receiver is blocked. An individual measuring time, selected with reference to the arrival sequence, is used as the common measuring time for the simultaneous measurement of the receiving vectors of all receivers.

5 Claims, 8 Drawing Figures

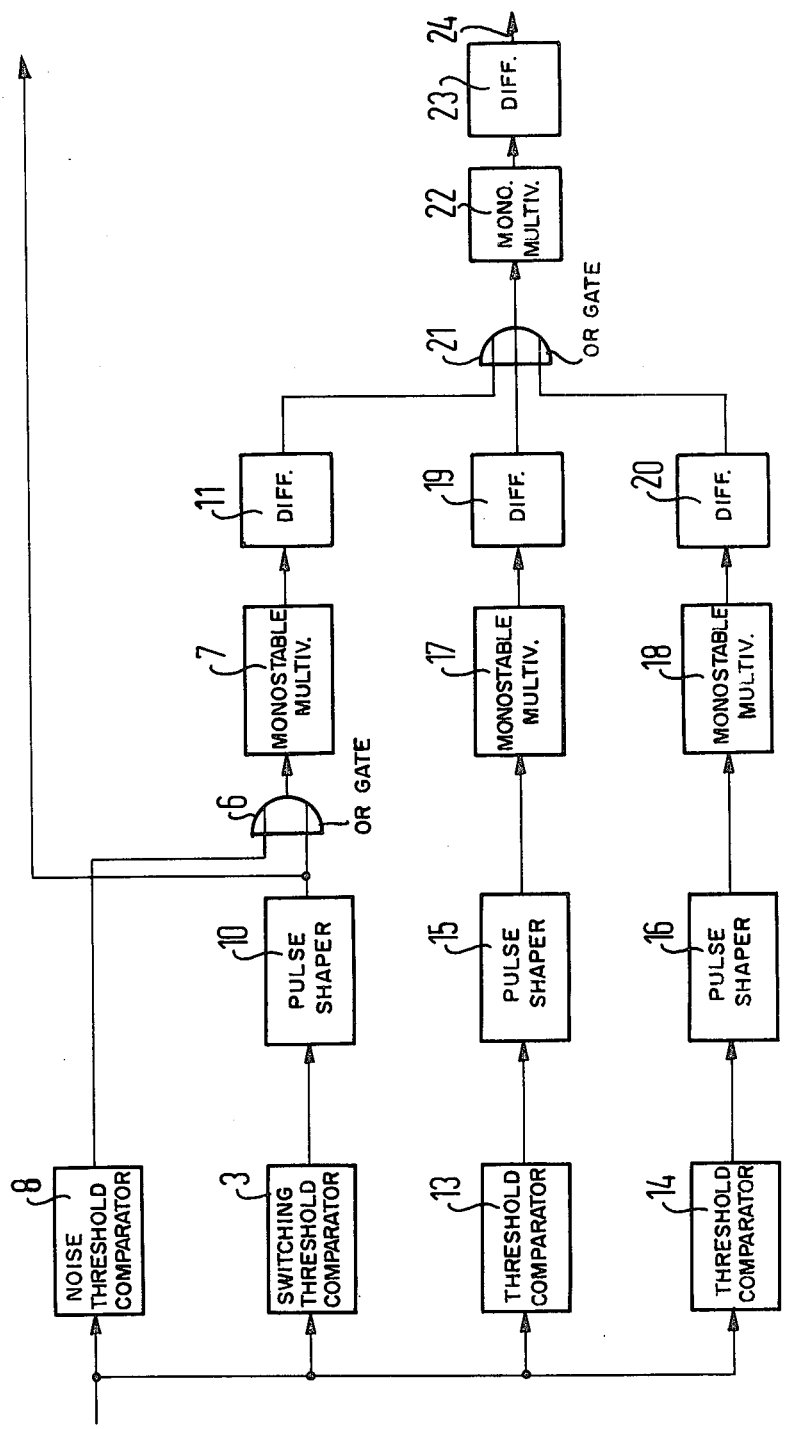

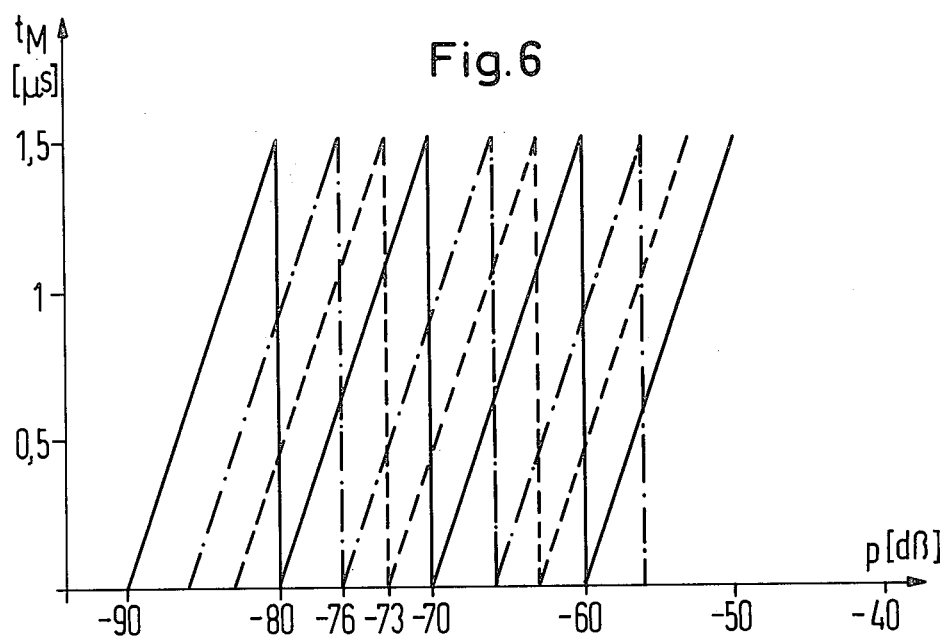
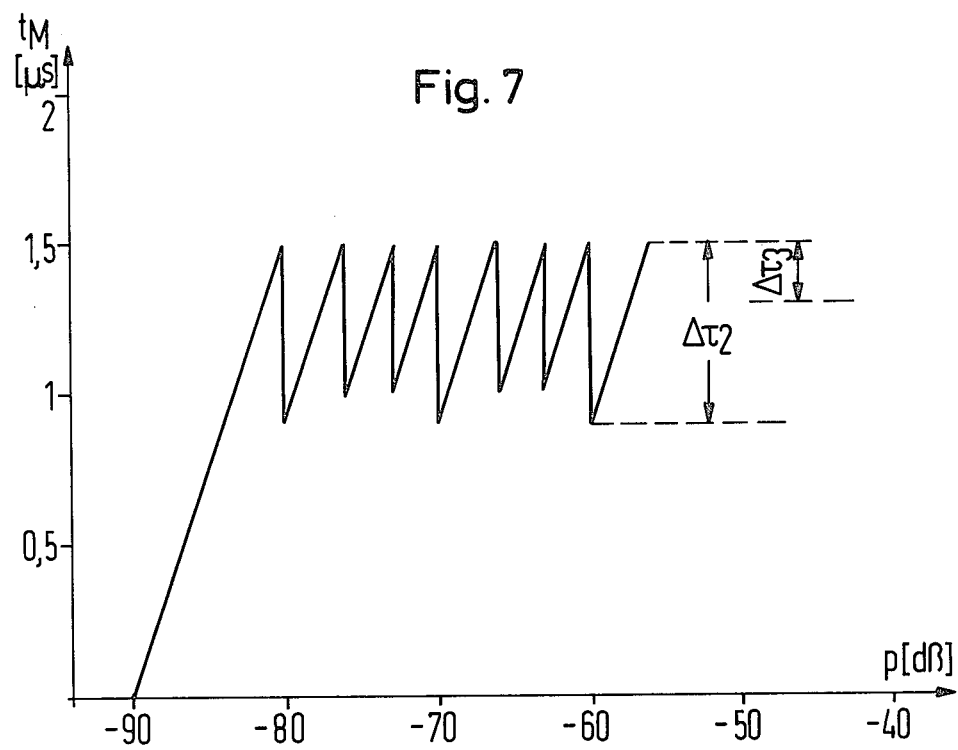

METHOD FOR THE COMPARATIVE VECTOR MEASUREMENT OF SIGNAL PULSES ARRIVING NEARLY SIMULTANEOUSLY AT SEVERAL RADIO RECEIVING STATIONS

CROSS-REFERENCE TO RELATED APPLICATION

This application is related to an application of Klaus v. Pieverling, Ser. No. 629,282, now U.S. Pat. No. 4,047,176 of the same title filed on even date herewith and assigned to the same assignee as the present invention.

BACKGROUND OF THE INVENTION

1. Field of the Invention

This invention relates to a method for the comparative vector measurement of signal pulses which arrive nearly simultaneously as several radio receivers, and more particularly to a method by means of which the output information can be measured simultaneously at the outputs of all of the receivers at a suitable moment.

2. Description of the Prior Art

The above-noted application of Klaus v. Pieverling concerns a method for the comparative vector measurement of keyed radio pulses arriving nearly simultaneously at several receivers, particularly DME pulses which can exhibit great level differences. The pulses at each receiver are initailly fed to an amplifier or attenuator having an amplification or attenuation, respectively, which can be adjusted in distinct steps, the reduction or increase, respectively, occurring automatically with the rise of the leading edge of the respective signal pulse. After passing through the respective amplifier or attenuator of the receivers, the instantaneous amplitudes of the measuring signals are measured at a specific measuring time which is common to all receivers.

Particularly in position finding technology, the problem arises in measuring signal pulses with respect to amplitude and phase, particularly when such pulses have strongly fluctuating levels and arrive at several receivers nearly simultaneously. Through such measurements the place of origin of a pulse which is transmitted and received at several receivers can be precisely determined, particularly from the reciprocal phase relationships of the oscillations.

SUMMARY OF THE INVENTION

The problem which forms the basis and object of the present invention is to provide a method of measurement by means of which the output information can be measured simultaneously at all receiver outputs at a suitable moment in order to arrest the instantaneous phase and amplitude conditions so that, on the basis of the behavior of each individual receiver, inference can be made regarding the wave front which has occurred at the antenna multiple assigned to the receivers.

In accordance with the invention, which concerns a method of the type initially mentioned, this problem is solved and the object is therefore achieved in that an individual measuring time is ascertained at each individual receiver in such a way that switching pulse derived from the step-wise reduction in amplification of the amplifier, or the step-wise increase in attenuation of the attenuator, respectively, are fed to a retriggerable monostable multivibrator having a specific holding time, during the operational sequence of which the individual measuring time of each receiver is provided.

After this individual measuring time or common measuring time for all receivers, an additional step-wise reduction in amplification or increase in attenuation, respectively, is blocked at the respective receiver, and an individual measuring time, selected with regard to the arrival sequence, is used as the common measuring time for the simultaneous measurement of the receiving vectors of all receivers. The time interval of two switching pulses of the circuit amplifier or the circuit attenuator, respectively, which adjusts itself in steps by means of automatic variation of amplification or attenuation in such a way that no over-control occurs, is used for the purpose of regulating the retriggerable monostable multivibrator. The time interval of two switching pulses is smaller the further removed the respective switching pulses are from the maximum of the radio signal pulse to be measured. If the next following switching pulse still lies within the holding time of the monostable multivibrator, the latter is triggered again. If, on the other hand, the next following switching pulse lies outside of the holding time, or if a switching pulse no longer arrives at all, the monostable multivibrator stage flops. The holding time of the monostable multivibrator is expediently selected in such a way that this flop occurs temporarilly within a specific zone prior to the maximum of the radio signal pulse to be measured.

In order to achieve a measuring time which is located as regularly as possible before the pulse maximum, it is expedient to additionally send the radio signal pulses to be measured in each of the receivers to one or more retriggerable monostable vibrators having equal holding time, which monostable multivibrators have minimum operating thresholds which lie below the step interval of the amplifier or the attenuator, respectively. Thus, the flop edges of the signals of all monostable multivibrators are connected by way of multiple OR gates, so that the first pulse, respectively, of the pulse group appearing at the gate output can be determined as the individual measuring time of the respective receiver station.

Advantageously, the first operation of the retriggerable monostable multivibrator of each individual receiver occurs when the instantaneous value of the received radio signal pulse exceeds the noise threshold. By this measure, an individual measuring time can be derived even in the lowest input level range of the radio signal pulse to be measured, which does not necessitate a switching signal jump. If no switching threshold, but only the noise threshold is exceeded, the individual measuring time is located beyond that time at which the noise threshold is exceeded by the amount of holding time.

In order that the determination of the common measuring time not be triggered by a signal, if possible, which exhibits only a minimal distance from the noise signal, or exhibits only chance characteristics, the signals assigned to the individual measuring times are added up to the point of exceeding a threshold, which is adjusted in such a way that the individual measuring time signals of a specific fraction of all receivers is required in order to exceed it. Only upon exceeding the threshold is a common measuring time pulse provided to all receivers for the purpose of vector measurement and possibly also for the purpose of blocking the amplifiers or attenuators of the receivers.

BRIEF DESCRIPTION OF THE DRAWINGS

Other objects, features and advantages of the invention, its organization, construction and operation will be best understood from the following detailed description of a preferred embodiment taken in conjunction with the accompanying drawings, on which:

FIG. 5 is a block diagram illustration of an expansion with respect to the arrangement according to FIG. 3;

FIG. 6 is a graphic illustration of the progression of the time interval of the measuring time pulse from the maximum of the radio signal pulse to be measured as a function of the input level for the arrangement according to FIG. 5;

FIG. 7 is a graphic illustration of the resulting time fluctuation of an individual measuring time of the arrangement according to FIG. 5.

DESCRIPTION OF THE PREFERRED EMBODIMENTS

Figure 1:
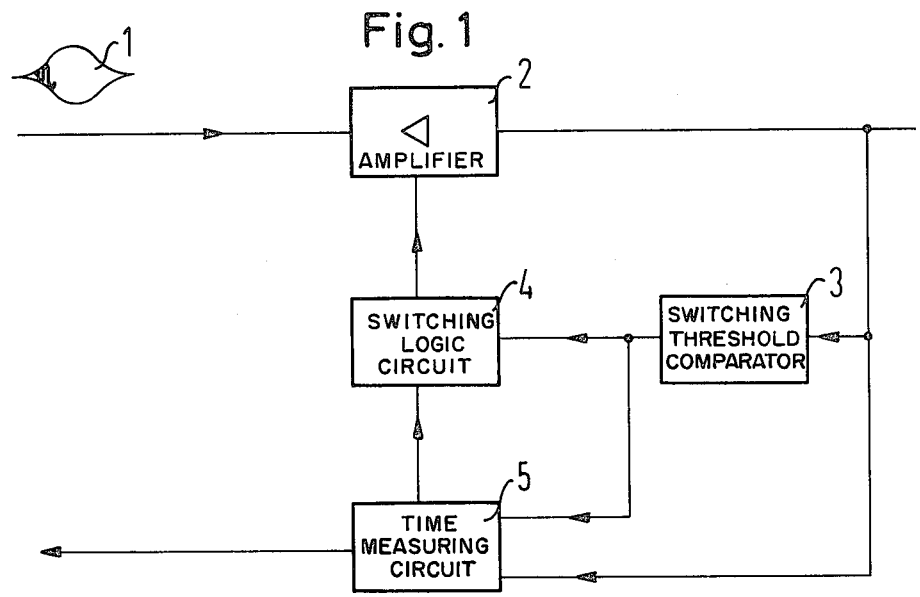
FIG. 1 is a block diagram illustration of an individual receiver.

Referring to FIG. 1, in a block circuit diagram a section from the IF portion of an individual receiver of a receiver multiple for the purpose of vector evaluation of DME pulses is illustrated. In the measuring of DME pulses according to amplitude and phase, it is important that the evaluation of the information takes place on the leading edge of a received pulse because this position presents the least possibility of interference due to alternate route spreading. Therefore, the problem exists of determining a measuring time which lies, for example, between the 50% point and the 90% point of the pulse envelope of the bell-shaped DME pulse. A DME pulse 1, converted from 1 GHz by way of 63 MHz to 4 MHz reaches a circuit amplifier 2. The circuit amplifier 2 always reduces its amplification in steps of 10 dB, when a comparator 3 indicates that a specific switching threshold (for example 10 dB) is exceeded. A switching logic circuit 4 regulates the corresponding circuit elements in the circuit amplifier 2. This switching logic circuit 4, including the comparator 3, is described in connection with FIG. 30 of the above-mentioned application, Ser. No. 629,282, now U.S. Pat. No. 4,047,176, which illustrates a known device for pulse vector measurement.

Figure 2:
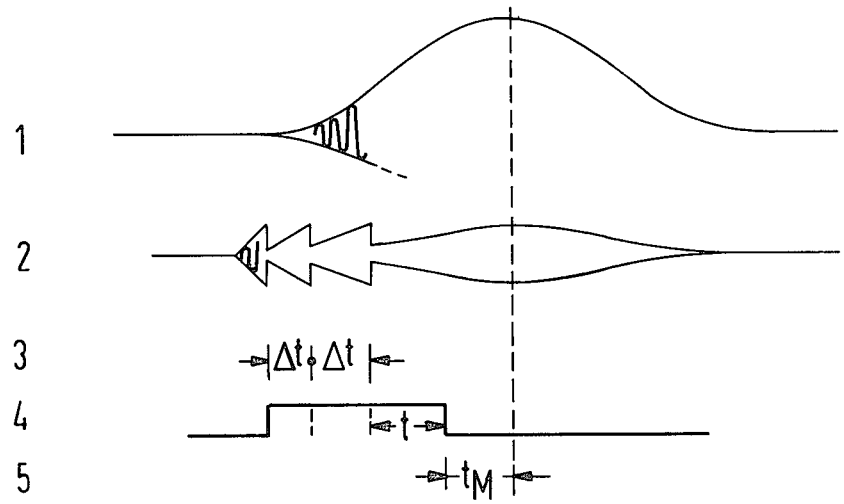
FIG. 2 is a pulse diagram for various positions of the block circuit diagram illustated in FIG. 1.

FIG. 2 illustrates a DME pulse 1 in the first line. At the output of the circuit amplifier 2, the pulse illustrated on the second line of FIG. 2 appears. In order to solve the problem of determining the measuring time, the time interval $\Delta t$ of two 10 dB switching pulses are used (FIG. 2, line 3). The further removed the respective switching pulses are from the maximum, the smaller $\Delta t$ is. The switching pulses operate a retriggerable monostable multivibrator having a holding time $t$ (FIG. 2, line 4). If the next following switching pulse still lies within the time $t$, the multivibrator is operated again. In the example illustrated in FIG. 2, this condition ceases after the third pulse so that the output of the monostable multivibrator switches to zero after the holding time $t$. The time constant $t$ of the monostable multivibrator is selected in such a way that there is an occurrence of multivibrator flop between the 50% point and the 90% point, relative to the maximum of the DME pulse 1. The individual measuring time for the receiver is provided with the time $t_M$ prior to the DME pulse maximum, corresponding to FIG. 2, line 5. The flop edge of the output pulse of the monostable multivibrator is provided as the measuring time pulse. Each individual receiver produces this pulse for itself. In FIG. 1 a circuit for ascertaining the individual measuring time is designated at 5, this circuit being placed at the disposal of a central assembly for the purpose of determining a measuring time which is common to all receivers. Such a time measuring circuit 5 is illustrated in detail in FIG. 3.

Figure 3:
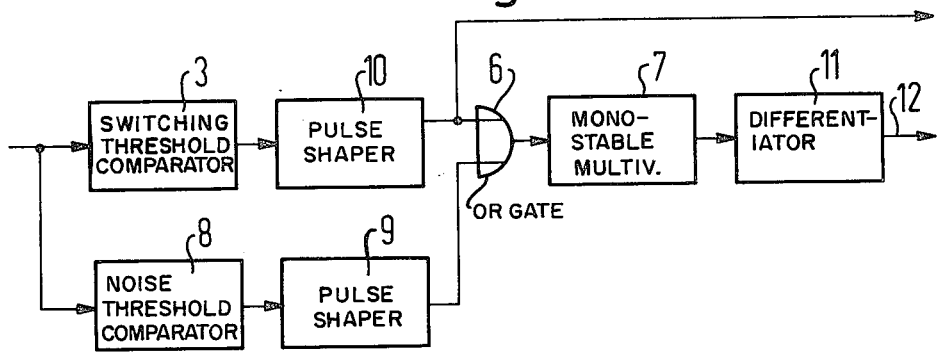
FIG. 3 is a block diagram of an arrangement for the determination of an individual measuring time.

Referring now to FIG. 3, an exemplary circuit for determining the individual measuring time of a receiver is illustrated. The pulse coming from the circuit amplifier exceeds the noise threshold and operates a retriggerable monostable multivibrator 7 by way of an OR gate 6. A noise threshold comparator 8 is provided in order to be able to derive the measuring time even in the lowest input level zone, so that there is no necessity for any switching pulse jump. A pulse shaper 9 is connected to the output of the noise threshold comparator 8. If the noise threshold, and no switching threshold, is exceeded, the measuring time lies behind the noise threshold point by the time $t$ (the holding time of the monostable multivibrator 7). If the input level increases, the switching threshold (10 dB) is also exceeded. The singular or repeated exceeding of the switching threshold is determined with the comparator 3 which has a pulse shaper 10 (in FIG. 1 combined with the comparator 3) connected between the output thereof and an input to the OR gate 6. The switching pulse delivered from the pulse shaper 10 (a monostable multivibrator) additionally operates the retriggerable monostable multivibrator 7 by way of the OR gate 6. The flop edge of the output pulse of the monostable multivibrator 7, which is differentiated in a differentiating element 11, is provided as an individual measuring time pulse at 12 for the individual receiver.

The latter is employed for the purpose of preventing the switching of additional attenuating steps in the circuit amplifier, and for the purpose of triggering the signal evaluation in the receiver. The time measuring circuit (circuit 5 in FIG. 1) accordingly comprises the OR gate 6, the monostable multivibrator 7, the noise threshold comparator 8, including the pulse shaper 9, and the differentiator 11.

Figure 4:
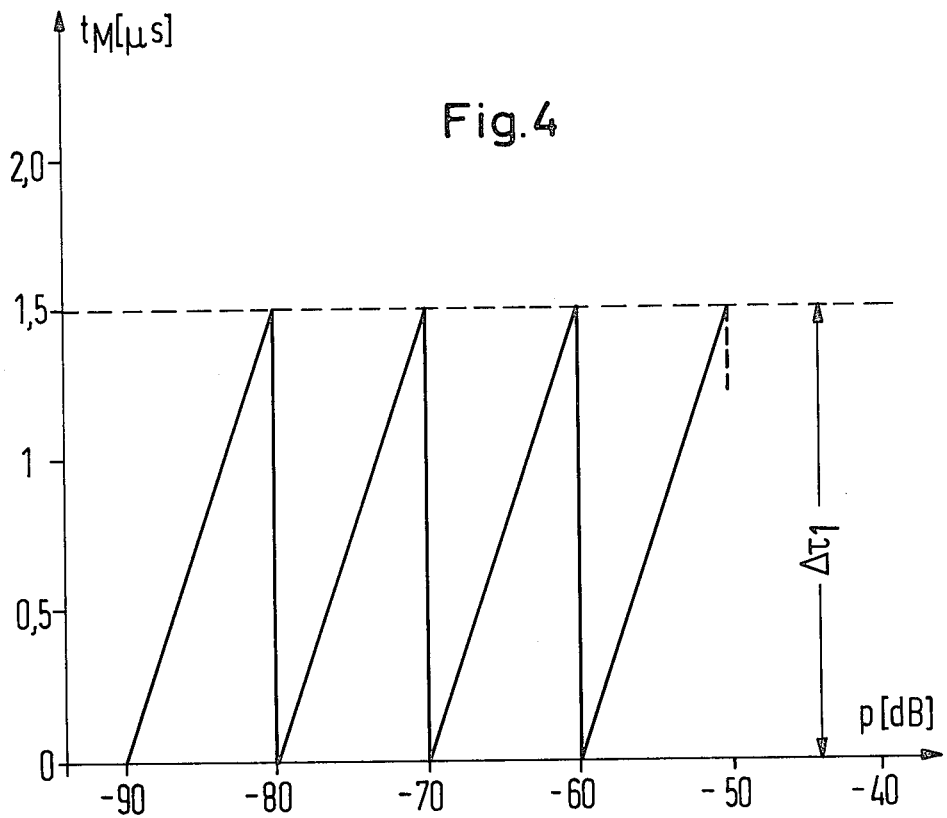
FIG. 4 is a graphic illustration of the progression of the time interval of the individual measuring time pulses from the maximum of the radio signal pulses to be measured as a function of the input level.

Referring to FIG. 4, the progression of the time interval $t_M$ of the individual measuring time from the maximum of the DME pulse is illustrated as a function of the input level $p$ (in dB). With an input level of $p = -90$ dB, the noise threshold is just exceeded. With an increasing level $p$, the time interval $t_M$ becomes greater, because the threshold, relative to the maximum, is exceeded earlier. This tendency is maintained until the first switching pulse occurs, and the level then falls into the holding time $t$ of the monostable multivibrator 7. The consequence of this is that the pulse width of the monostable multivibrator 7 becomes doubled, and the time interval $t_M$ is reduced correspondingly with regard to the maximum. This is how the illustrated sawtooth progression with the fluctuation $\Delta \tau 1$ arises.

This jump-like behavior of the individual measuring time (digitalization error) can be reduced by an expansion of the circuit according to FIG. 3. Referring to the block diagram of FIG. 5, an arrangement is illustrated in which, in order to define the resulting individual measuring time of a receiver, the simple circuit according to FIG. 3 is expanded by two additional channels. In addition to the noise threshold (noise threshold comparator 8) and the switching threshold (switching threshold comparator 3 having a pulse shaper 10) two additional thresholds are introduced. One of these additional thresholds lies approximately 3 dB below the switching threshold (10 dB), and the other threshold lies approximately 6 dB below the switching threshold. By means of a pair of comparators 13 and 14 for these thresholds, two retriggerable monostable multivibrators 17, or 18, respectively, are operated via respective pulse shapers 15 and 16, respectively. These monostable multivibrators have basically the same function as the monostable multivibrator 7, regulated by way of the OR gate 6, and produce additional staggered sawtooth curves, so that the result illustrated in FIG. 6 is obtained. In FIG. 6, the solid line sawtooth curve is obtained at the output of the differentiation element 11, the dot-dash sawtooth curve is obtained at the output of the differentiation element 19, and the broken line sawtooth curve is obtained at the output of the differentiation element 20. Each of the differentiation elements 11, 19 and 20 differentiates the respective flop edge of the preceding monostable multivibrator 7, 17 or 18, respectively.

The flop edges of the monostable multivibrators are fed via a three input OR gate 21 as illustrated in FIG. 5 so that a pulse group appears at the output of the OR gate 21. From this group, each individual first pulse is to be determined. This takes place by means of a monostable multivibrator 22. The rising edge of the output pulse, ascertained in a differentiation element 23, indicates the time of the first pulse in each case. This time is fed out as the resulting individual measuring time 24 per individual receiver. The monostable multivibrator 22 reacts to the earliest arriving pulse, i.e., the leading edge of the output pulse first passes through the solid line curve. At $p = -80$ dB, the transition to the dot-dash curve takes place. At $p = -76$ dB, the broken line curve takes over, and at $p = -73$ dB the solid line curve again becomes active.

The result of the above mode of operation is illustrated in FIG. 7. The time fluctuation zone $\Delta\tau 2$ of the measuring time in relation to the maximum of the DME pulse has therefore been clearly reduced, compared with the arrangement according to FIG. 3.

In the case of a receiver multiple (for example 32 receivers), each receiver delivers an isolated measuring time. These measuring times do not arrive simultaneously because varying levels occur at the receivers.

Figure 8:
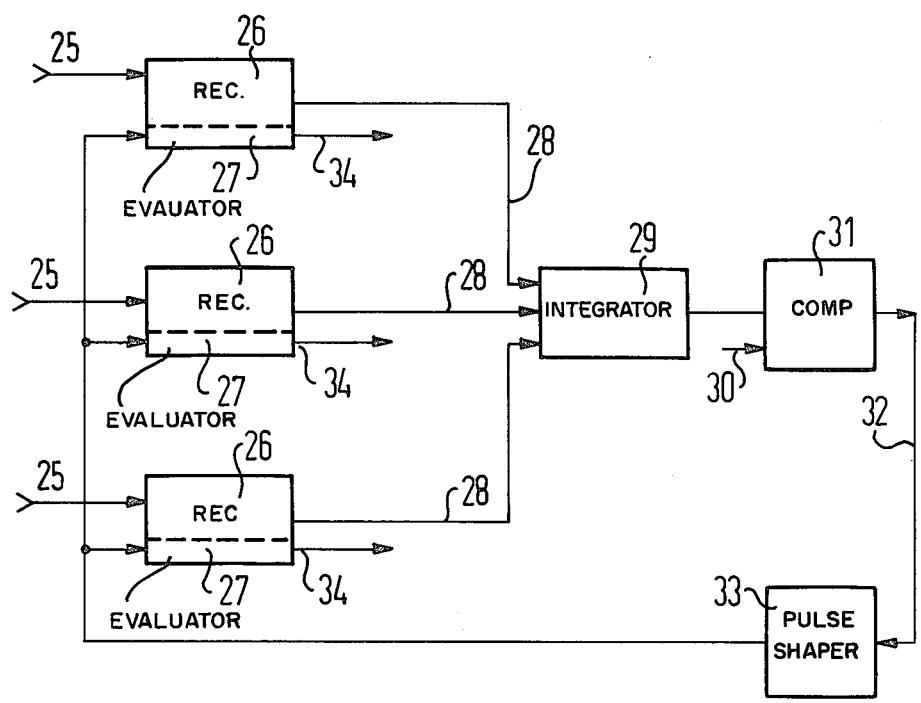
FIG. 8 is a block diagram of the circuit arrangement for the purpose of a central determination of a common measuring time for all receivers.

The analyzers connected to the individual receivers provide useful test results of amplitude and phase only if measurement is undertaken in all evaluators at precisely the same time. It follows therefrom that a resulting measuring time pulse must be delivered from the data of the individual receivers, which pulse is then delivered to the evaluators in all receivers. There it is used for the purpose of providing the instruction for scanning the applied voltage value. In FIG. 8, a multiple of receivers 26, equipped with antennas 25, is provided. Each of the receivers includes an evaluator 27. The individual measuring time pulses 28 of the individual receivers 26 pass into an integration circuit 29, which is housed in a central assembly. Integration takes place, for example, by charging a capacitor. On exceeding a specific threshold, indicated at 30, which is determined by a comparator 31, the "central measuring time pulse" 32 arises, which undergoes an additional uniform shaping in an impulse shaper 33. This threshold 30 is adjusted in such a way that the individual measuring time pules 28 of, for example, 10 receivers 26 are required in order to exceed that threshold. The 10 first measuring time pulses 28 therefore become active. If fewer than 10 receivers 26 deliver measuring time pulses 28, it can be assumed that there is no receivable signal present. The amplitude values and phase values of the entering radio signal pulse, measured at a common measuring time in the evaluators 27, are forwarded for data processing at the outputs 34. Each evaluator 27 may comprise a zero detector for phase measurement, i.e. for the purpose of zero passage analysis, and two gates activated by the time measuring circuit and connected to a digital measuring circuit and to an analog peak voltage (momentary amplitude) measuring circuit for amplitude measurement. A detailed description of the known device for pulse vector measurement is provided in connection with FIG. 30 of the above-mentioned application and repetition herein is not deemed necessary.

Since, due to varying levels, the time intervals $t_M$ relative to the maximum of the DME pulse is statistically distributed, the time fluctuation zone $\Delta\tau 2$ (FIG. 7) is further reduced. In a group of 32 receivers, for example, the point of concentration of this zone is situated in the upper third ($\Delta\tau 3$ in FIG. 7).

The central common measuring time could also be determined by combining all individual measuring time pulses by way of a multiple OR gate, so that the pulse which appears earliest is delivered as the central measuring time. Although the fluctuation zone would thereby be still further narrowed, this solution is not so expedient in that the central measuring time would then be too dependent upon the accidental occurrences befalling individual receivers, which can be subject to noise.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for the comparative vector measurement of keyed radio signal pulses which arrive nearly simultaneously at several receivers, in particular DME pulses, which can exhibit greatly fluctuating level differences, in which the pulses are fed to a level reducing circuit having automatically stepped adjustment in response to each increase over a definite threshold during the rising of the leading edge of a signal pulse and in which the instantaneous amplitudes of the received measuring signals are measured at a specific measuring time common to all receivers, the improvement therein comprising the steps of:

deriving in each receiver a special switching pulse from each step adjustment caused by exceeding the definite threshold in the respective receiver;
applying the special switching pulses to a retriggerable monostable multivibrator to retrigger and hold the same in its unstable condition, the monostable multivibrator having a specific return time to its stable condition;

blocking the step adjustment after the measuring time; and selecting a measuring time with respect to the arrival sequence of the radio pulses as a common measuring time for simultaneous measurement for the receiving vectors of all of the receivers.

2. The method of claim 1, comprising the step of:

operating the monostable multivibrator during a received measuring pulse to return to its stable state within a specific zone prior to the maximum of the receiving pulse.

3. The method of claim 1, comprising the steps of:

adding the received signals assigned to individual measuring times to a point of exceeding a predetermined threshold;

adjusting the threshold such that operation of a specific fraction of all receivers is necessary to exceed the threshold; and generating a common measuring time pulse for all receivers upon exceeding the threshold.

4. The method of claim 1, comprising the step of triggering the retriggerable monostable multivibrator of each receiver when the signal received by that receiver exceeds a predetermined noise threshold.

5. The method of claim 1, comprising the steps of:

in each receiver triggering additional monostable multivibrator with the respective received radio signal, the monostable multivibrators having equal return times and operating thresholds which are less than the step-adjustment interval; and applying the output signals of the additional monostable multivibrators to an OR gate so that the first pulse output by the OR gate from the group of pulses applied thereto is determined as the measuring time signal of the respective receiver.

* * * * *